March 11, 1969 S. K. ROBY 3,432,675

OPTICAL PROGRAMMING WITH CROSSED LIGHT GUIDES

Filed Sept. 15, 1965 Sheet 1 of 2

INVENTOR.
S KINGSLEY ROBY

BY [signature]

ATTORNEY

March 11, 1969 S. K. ROBY 3,432,675

OPTICAL PROGRAMMING WITH CROSSED LIGHT GUIDES

Filed Sept. 15, 1965 Sheet 2 of 2

INVENTOR.
S. KINGSLEY ROBY
BY [signature]
ATTORNEY

United States Patent Office 3,432,675
Patented Mar. 11, 1969

3,432,675

OPTICAL PROGRAMMING WITH CROSSED LIGHT GUIDES

S Kingsley Roby, P.O. Box 204, West Church Road, Saddle River, N.J. 07458

Filed Sept. 15, 1965, Ser. No. 487,529
U.S. Cl. 250—227 10 Claims
Int. Cl. H01j *5/16;* G01n *21/30;* G02b *5/14*

This invention relates generally to programming devices, that is, devices which establish a predetermined programmed relationship or correspondence between the energization of a series of input circuits and the energization of a series of output circuits.

Such programming devices have many applications, for example, in automated machinery where the input circuits may be energized in response to the sensing of certain conditions and the output circuits are energized to perform respective control functions, or in chemical or food processing equipment where the input circuits may be sequentially energized with the passage of time or the occurrence of other sensed conditions, and the output circuits are energized to control the addition of chemicals or other constituents to a batch or mixture being processed. In existing programming devices, changes in the programmed relationship between the energization of the input and output circuits are effected by complicated mechanical switching arrangements which are relatively costly and which require considerable time and care in setting-up a new program.

Accordingly, it is an object of this invention to provide a relatively simple programming device that is capable of conveniently setting-up a wide variety of programs.

Another object is to provide a programming device of the described character which operates optically to achieve the desired programmed relationship.

In accordance with an aspect of this invention, an optical programming device includes a plurality of first light conducting elements each having input and output ends and being adapted to receive light at the input end, for example, from a light source which is illuminated upon energization of a respective input circuit, for transmission through the first light conducting element to the output end of the latter, a plurality of second light conducting elements each having an input end disposed adjacent, and registering with areas of the output ends of all of the first light conducting elements so that the second light conducting elements are adapted to receive light from any of the first light conducting elements for transmission through the second elements to light sensitive means, for example, in the form of photo-electric cells, which are interposed in output or control circuits and disposed adjacent output ends of the respective second light conducting elements, and a masking member disposed between the output ends of the first elements and the input ends of the second elements and having opaque and transparent areas to selectively determine which of the second elements receive light from each of the first elements. Thus, the program or relationship between the energization of the input circuits and the energization of the output or control circuits can be varied merely by changing the pattern of the opaque and transparent areas on the masking member, for example, as by replacement of the masking member.

In a preferred embodiment of the invention, the output ends of the first light conducting elements are of rectangular cross-section and arranged parallel to each other, while the input ends of the second light conducting elements are also of rectangular cross-section and arranged parallel to each other, but with the major axes of the rectangular input ends of the second elements being at a substantial angle, for example, ninety degrees, with respect to the major axes of the output ends of the first elements.

The above, and other objects, features and advantages of the invention, will be apparent in the following detailed description of an illustrative embodiment thereof which is to be read in connection with the accompanying drawings forming a part hereof, and wherein.

Figures 1, 2:
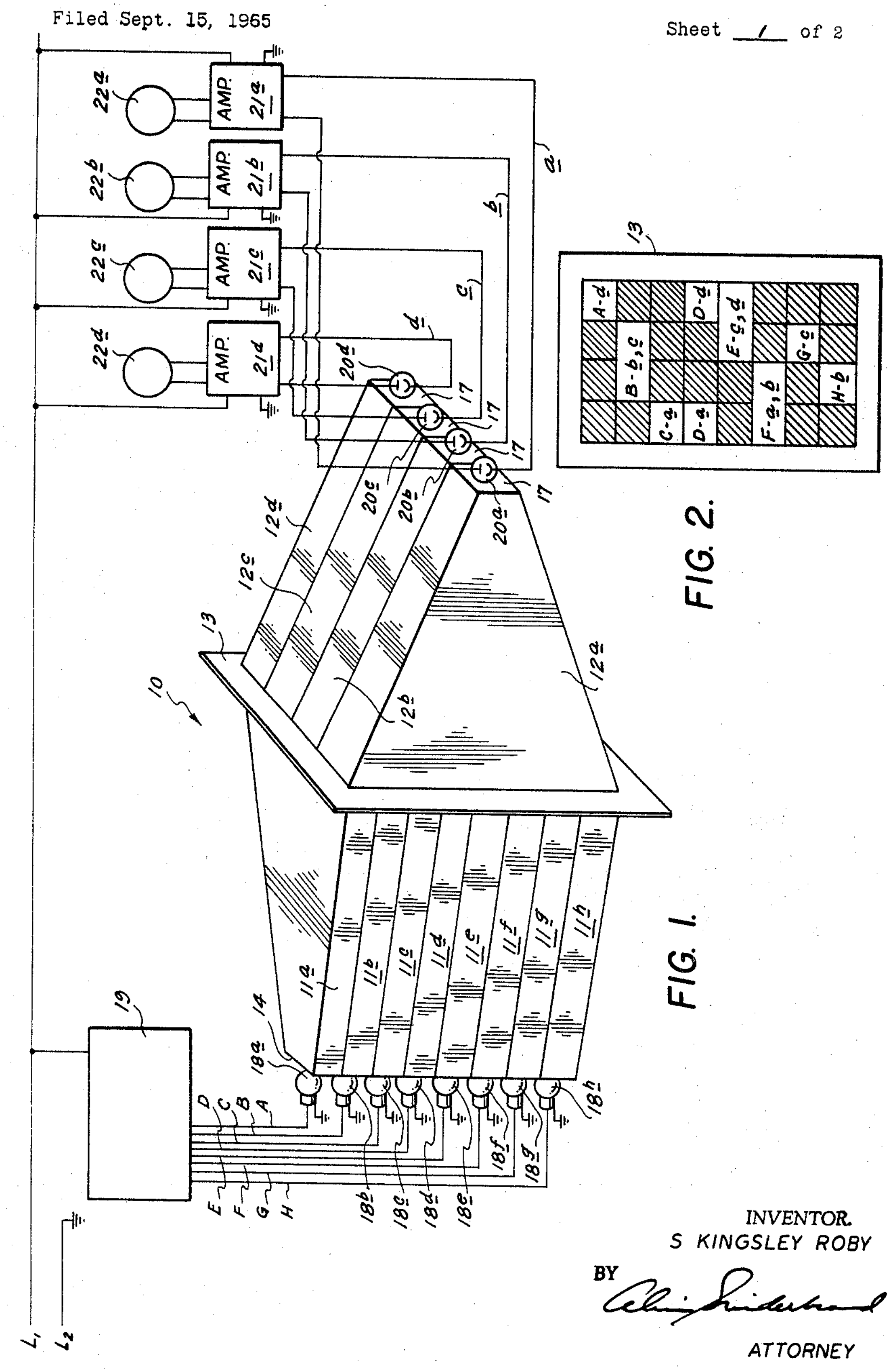
FIG. 1 is a diagrammatic view of an optical programming device embodying this invention for establishing a changeable programmed relationship between the energization of several input and output circuits.
FIG. 2 is a view showing a masking member for determining the changeable program in a device embodying this invention.

Referring to the drawings in detail, and initially to FIG. 1 thereof, it will be seen that an optical programming device 10 embodying this invention generally includes a first or input series of light conducting elements 11*a*–11*h*, a second or output series of light conducting elements 12*a*–12*d*, and a masking member 13.

Figure 5:
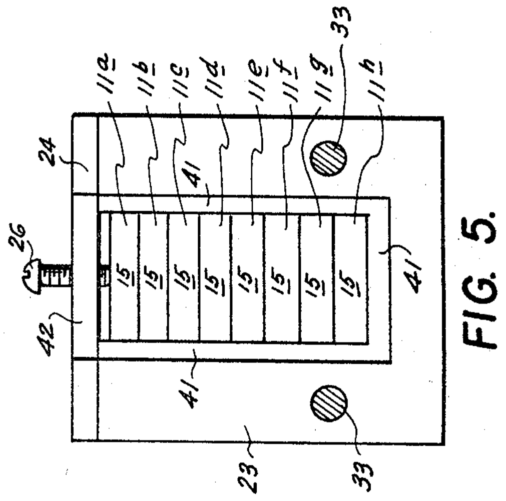
FIG. 5 is a transverse sectional view taken along the line 5—5 on FIG. 3.

The light conducting elements 11*a*–11*h* may be conveniently formed of a solid, light-transmitting plastic material, such as, methyl methacrylate, and may be of rectangular cross-section, as shown, with each of the elements 11*a*–11*h* increasing in lateral dimension from a relatively small width at its input end or surface 14 to a relatively large width at its output end or surface 15 (FIG. 5). Each of the light conducting elements 11*a*–11*h* further may have a coating of paint or other opaque material covering its entire surface with the exception of the input and output end surfaces 14 and 15 thereof so that light admitted at the input end surface 14 of each of the elements 11*a*–11*h* will be transmitted therealong and will issue from the light conducting element only at the respective output end surface 15. The light conducting elements 11*a*–11*h* may be arranged in a vertical stack, as shown, so that the rectangular output end surfaces 15 thereof are disposed in a common plane and have their major axes extending horizontally parallel to each other.

The light conducting elements 12*a*–12*d* of the second or output series may be similarly conveniently formed of methyl methacrylate or any other suitable light-transmitting solid plastic material and are entirely coated with paint or other opaque material except at input surfaces 16 and output surfaces 17 provided at the opposite ends of the elements 12*a*–12*d*. The elements 12*a*–12*d* also conveniently have rectangular cross-sections which decrease progressively or taper from maximum areas at the input end surfaces 16 to minimum areas at output end surfaces 17. The elements 12*a*–12*d* are arranged in a stack so that the rectangular input end surfaces 16 lie in a common plane and have their major axes parallel to each other.

The stacks of light conducting elements 11*a*–11*h* and 12*a*–12*d* are supported, as hereinafter described in detail, so that the common planes of output end surfaces 15 and input end surfaces 16 are parallel to each other and closely adjacent, but with the major axes of the input end surfaces 16 extending at a substantial angle, for example, at ninety degrees as shown, with respect to the major axes of the rectangular output end surfaces 15. Thus, in the illustrated embodiment having the major axes of the rectangular end surfaces 15 extending horizontally, the major axes of the input end surfaces 16 are arranged vertically. Further, as shown, the output end surfaces 15 and input end surfaces 16 are respectively dimensioned so that each surface 15 will extend laterally across all of the input end surfaces 16, and each input end surface 16 will extend vertically across all of the output end surfaces 15. Thus, each output end surface 15 has areas thereof registering with areas of all of the input end surfaces 16.

By reason of the above described relationship between the surfaces 15 and 16, each of the light conducting elements 12*a*–12*d* is adapted to receive, at its input end surface 16, light issuing from the output end surface 15 of any of the light conducting elements 11*a*–11*h*.

The light conducting elements 11*a*–11*h* selectively receive light, at their input end surfaces 14, for example, from adjacent disposed light sources 18*a*–18*h*, respectively, which are energized through respective input circuits A–H. The input circuits may be energized from supply lines $L_1$ and $L_2$ in any desired order or sequence, for example, through a suitable timing device 19, as shown, or through any other conventional devices which sense the occurrence of any predetermined conditions.

Programming device 10 further has light sensitive means, for example, in the form of photo-electric cells 20*a*–20*d*, disposed adjacent the output end surfaces 17 of light conducting elements 12*a*–12*d*, respectively, and being interposed in output or control circuits *a*–*d*. Thus, when any one of elements 12*a*–12*d* receives light from any of the elements 11*a*–11*h*, such light is transmitted along the element 12*a*–12*d* so as to issue from the output end surface 17 and impinge on the adjacent photo-electric cell 20*a*–20*d* for energizing the respective output or control circuit *a*–*d*. The output or control circuits *a*–*d* may be connected to the input terminals of corresponding amplifiers 21*a*–21*d*, and the output terminals of such amplifiers may be suitably connected to solenoid controlled valves, motors, or other electrically operated devices 22*a*–22*d* for effecting corresponding control functions. Thus, any one of the control devices 22*a*–22*d* will be operated in response to energization of its corresponding control circuit *a*–*d* by impingement of light on the respective photo-electric cell 20*a*–20*d*.

As previously described, in the absence of masking member 13, each of the light conducting elements 12*a*–12*d* is adapted to receive light from each of the light conducting elements 11*a*–11*h*. Thus, in the absence of masking member 13, the energization of any one of the input circuits A–H would cause energization of all of the output circuits *a*–*d* and thereby effect operation of all of the control devices 22*a*–22*d*. However, when masking member 13 is interposed between the output end surfaces 15 and the input end surfaces 16, there is established a predetermined, changeable programmed relationship between the energization of the input circuits A–H and the resulting energization of the output circuits *a*–*d*.

As shown on FIG. 2, masking member 13 has opaque and transparent areas, respectively represented by the shaded and clear areas on the drawing, to determine which of the light conducting elements 12*a*–12*d* will receive light from each of the light conducting elements 11*a*–11*h*, and hence which of the output circuits *a*–*d* will be energized in response to energization of each of the input circuits A–H. By way of example, in the masking member 13 shown on FIG. 2, opaque areas are provided at the areas of the input end surfaces 16 of elements 12*a*, 12*b* and 12*c* that register with the output end surface 15 of element 11*a*. Thus, when input circuit A is energized to effect illumination of the respective light source 18*a*, the light transmitted through element 11*a* is received only by the element 12*d* and issues from the output end surface 17 thereof for impingement on photo-electric cell 20*d*, thereby energizing only output or control circuit *d*. The other opaque and transparent areas of the pattern provided on the masking member 13 are arranged, in the illustrated example, so that energization of input circuit B effects energization of output circuits *b* and *c*; energization of input circuit C effects energization of output circuit *a*; energization of input circuit D effects energization of output circuits *a* and *d*; energization of input circuit E effects energization of output circuits *c* and *d*; energization of input circuit F effects energization of output circuits *a* and *b*; energization of input circuit G effects energization of output circuit *c*; and energization of input circuit H effects energization of output circuit *b*. Obviously, by providing a different pattern of the opaque and clear areas on masking member 13 interposed between the end surfaces 15 and 16, for example, by replacing the masking member with another masking member having the changed pattern of opaque and transparent areas, or by providing such opaque and transparent areas on a strip of film which is displaced between the confronting end surfaces 15 and 16, the program or relationship of the responsive energization of circuits *a*–*d* to the sequential energization of the circuits A–H may be correspondingly altered.

Although the programming device 10, as schematically illustrated on FIG. 1, has eight light conducting elements 11*a*–11*h* for selectively directing light into four light conducting elements 12*a*–12*d*, and thus is effective for programming the response of four output circuits *a*–*d* to the sequential energization of eight input circuits A–H, it is apparent that the numbers of light conducting elements in the two stacks may be suitably varied when the number of output or control circuits is equal to or greater than the number of input circuits.

Figure 4:
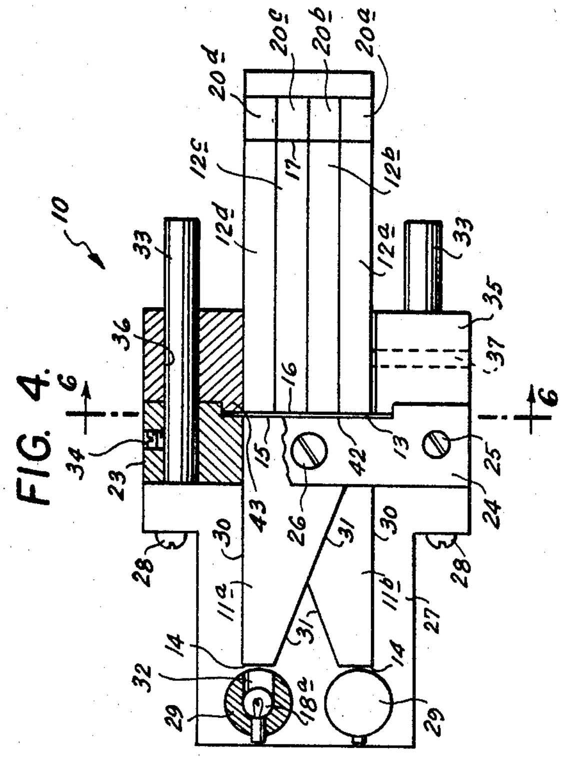
FIG. 4 is a top plan view of the device of FIG. 3, shown partly broken away and in section.
Figure 6:
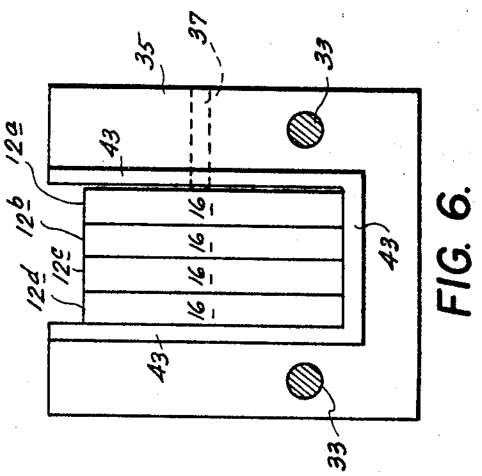
FIG. 6 is a transverse sectional view taken along the line 6—6 on FIG. 4.
Figure 3:
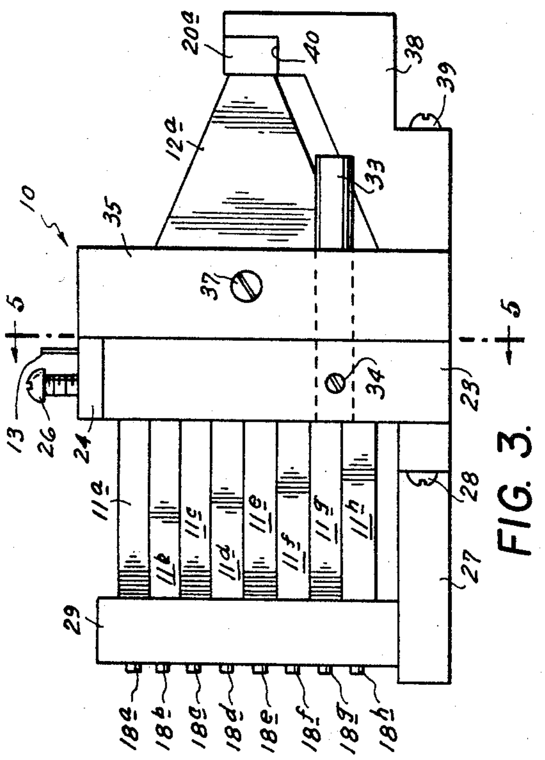
FIG. 3 is a side elevational view of a simple practical construction for a programming device in accordance with the invention.

Referring now to FIGS. 3 to 6, it will be seen that, in a simple practical construction embodying this invention, the large or output end portions of light conducting elements 11*a*–11*h* are received within, and laterally guided by a U-shaped frame member 23 having a cap 24 extending across the top thereof and being secured, at its opposite ends, to frame member 23, as by screws 25 (FIG. 4). A clamping screw 26 (FIGS. 3, 4 and 5) extends downwardly through a tapped central hole in cap 24 for clamping the stack of elements 11*a*–11*h* against the bottom portion of frame member 23. A base 27 extends under the lowermost light conducting element 11*h* from the bottom of frame member 23 to which the base is secured, as by screws 28 (FIGS. 3 and 4). A pair of laterally spaced apart posts 29 project upwardly from base 27 so as to be disposed adjacent the input end surfaces 14 of the light conducting elements secured in frame 23.

As shown particularly on FIG. 5, each of the light conducting elements 11*a*–11*h* may be advantageously formed with one straight side edge surface 30 at right angles to its output end surface 15 and with its other side edge surface 31 diverging with respect to the side edge surface 30 in the direction from the input end surface 14 toward the output end surface 15. The light conducting elements having the foregoing configuration are arranged so that, in the stack thereof, the straight side edge surfaces 30 of alternate light conducting elements are disposed at opposite sides of the stack. Thus, in the programming device 10 illustrated in the drawings, light conducting elements 11*a*, 11*c*, 11*e* and 11*g* are arranged with their straight side edge surfaces 30 at one side of the stack so as to dispose their input end surfaces 14 adjacent one of the laterally spaced posts 29, whereas the other or remaining light conducting elements 11*b*, 11*d*, 11*f* and 11*h* are arranged with their straight side edge surfaces 30 at the opposite side of the stack so as to dispose their input end surfaces 14 adjacent the other post 29.

The posts 29 for formed with bores 32 (FIG. 4) extending diametrically therethrough at locations suitably spaced apart along the axis of each post so as to register with the input end surfaces 14 of the light conducting elements adjacent the respective post. The bores 32 of the posts 29 receive and support the light sources 18*a*–18*h* which are associated with the adjacent input end surfaces 14 of the light conducting elements.

By reason of the above described disposition of the input end surfaces 14 of the alternate light conducting elements adjacent the two posts 29, such light conducting elements may be formed of relatively thin material and yet ensure that the vertical distances between the input end surfaces 14 adjacent each of the posts 29 will be adequate to permit the mounting of the associated bulbs or light sources therein.

Parallel guide rods 33 are secured in the opposite side portions of frame member 23, as by set screws 34 (FIGS 3 and 4) and extend from frame member 23 in the direction away from base 27. A U-shaped support member 35 is formed with parallel bores 36 (FIG. 4) extending through its opposite side portions to slidably receive guide rods 33 and thereby mount support member 35 for movement toward and away from frame member 23. The large or input end portions of light conducting elements **12*a*–12*d* are received within U-shaped support member 35, and a set screw 37 extends through one side portion of support member 35 so as to releasably clamp the stack of light conducting elements 12*a*–12*d* against the opposite side portion of the support member. A bracket 38 (FIG. 3) is secured to the bottom portion of support member 35, as by screws 39, and extends under light conducting elements 12*a*–12*d*. The bracket 38 terminates in a seat 40 on which the several photo-electric cells 20*a*–20*d* are suitably supported so as to be disposed adjacent the output end surfaces 17 of the respective light conducting elements 12*a*–12*d***.

The face of frame member 23 directed toward support member 35 is preferably rabbeted or grooved along the opposite sides and bottom of the opening which receives the output end portions of elements **11*a*–11*h*, as at 41 on FIG. 5, and the longitudinal edge surface of cap 24 facing toward support member 35 is centrally recessed, as at 42 (FIGS. 4 and 5) so as to define a guide into which the masking member 13 can be slidably inserted from above. The face of support member 35 directed toward frame member 23 has a projection or rib 43 (FIGS. 4 and 6) extending along the sides and bottom of the opening of U-shaped support member 35 and being dimensioned to extend into the guide for the masking member 13 defined by groove 41**.

As shown particularly on FIG. 4, the light conducting elements **11*a*–22*h* are located in frame member 23 so that the common plane of their output end surfaces 15 coincides with the inner surfaces of groove 41, and the light conducting elements 12*a*–12*d* are located in support member 35 so that the common plane of their input end surfaces 16 coincides with the outer surface of rib 43. Thus, when support member 35 is moved against frame member 23, as shown in FIG. 4, projection or rib 43 of the support member holds the masking member 13 securely against the inner surfaces of groove 41 to ensure correct positioning of the several opaque and transparent areas of the masking member with respect to the light conducting elements and the surfaces 15 and 16 closely engage the opposite faces of the masking member to ensure efficient light transmission through its transparent areas. However, when support member 35 is backed slightly away from frame member 23, the masking member 13 is released and its upper end portion which normally projects above cap 24**, as shown on FIG. 3, can be manually grasped for effecting the removal of the masking member from the frame. Thus, the masking member can be conveniently replaced by one having a different pattern of opaque and transparent areas, thereby to alter the programmed response of the output circuits to the sequential energization of the input circuits, as previously described herein.

Although an illustrative embodiment of this invention has been described in detail herein with reference to the accompanying drawings, it is to be understood that the invention is not limited to that precise embodiment, and that various changes and modifications may be effected therein by one skilled in the art without departing from the scope of spirit of the invention, except as defined in the appended claims.

What is claimed is:

1. In an optical programming device, the combination of a plurality of first light conducting elements each having input and output ends, means disposed adjacent said input ends of said first elements and being operative to selectively direct light into the input end of each of said first elements for transmission through the element to the output end thereof, a plurality of second light conducting elements each having input and output ends and being adapted to receive light at the input end for transmission through the element to the output end thereof, said first light conducting elements having their output ends disposed adjacent the input ends of said second light conducting elements, said output end of each of said first elements having areas thereof registering with areas of the input ends of all of said second elements so that each of said second elements is adapted to receive light from all of said first elements, light sensitive control means disposed adjacent said output end of each of said second elements and being operable by light conducted through the respective second element from any one of said first elements, and a masking member disposed between said output ends of the first elements and said input ends of the second elements, said masking member having opaque and transparent areas to selectively determine which of said second elements receive light from each of said first elements.

2. In an optical programming device, the combination as in claim 1; wherein said output ends of the first elements are of rectangular cross-section and are arranged parallel to each other, and said input ends of the second elements are also of rectangular cross-section and arranged parallel to each other, with the major axes of said rectangular cross-sections of the output ends of said first elements and of the input ends of said second elements enclosing substantial angles.

3. In an optical programming device, the combination as in claim 2; wherein said substantial angles are of approximately 90 degrees.

4. In an optical programming device, the combination as in claim 2; wherein said first elements are of substantially smaller cross-sectional area at said input ends than at said output ends thereof, and said second elements are of substantially smaller cross-sectional area at said output ends than at said input ends thereof.

5. In an optical programming device, the combination as in claim 1; wherein each of said first and second light conducting elements is of a solid, light-transmitting plastic material.

6. In an optical programming device, the combination as in claim 1; wherein each of said first and second light conducting elements is of methyl methacrylate.

7. In an optical programming device, the combination as in claim 1; wherein said means operative to selectively direct light into each of said first elements includes an individual light source for each of said first elements.

8. In an optical programming device, the combination as in claim 1; wherein said light sensitive control means includes an individual photoelectric cell for each of said second elements.

9. In an optical programming device, the combination as in claim 1; wherein the number of said first elements is different from the number of said second elements.

10. In an optical programming device, the combination of a plurality of first elements of light transmitting plastic material each having an input surface and an output surface, the output surfaces of said first elements being rectangular and disposed in a common plane with the major axes of said rectangular output surfaces extending parallel to each other, means disposed adjacent said input surfaces of said first elements and being operative to selectively direct light into each of said first elements for discharge therefrom at said output surface of the respective first element, a plurality of second elements of light transmitting plastic material each having an input surface and an output surface, the input surfaces of said second elements being rectangular and disposed in a common plane substantially parallel to said common plane of the output surfaces of said first elements, said rectangular input surfaces of the second elements being arranged with their major axes substantially at right angles to said major axes of said rectangular output surfaces of the first elements so that areas of said input surface of each of said second elements register with areas of said output surfaces of all of said first elements, light sensitive control means disposed adjacent said output surface of each of said second elements and being operable by light transmitted through the respective second element from any one of said first elements, and a masking member disposed between said planes of the output and input surfaces of said first and second elements, respectively, said masking member having a predetermined pattern of opaque and transparent areas to selectively determine which of said second elements can receive light from each of said first elements.

References Cited

UNITED STATES PATENTS

| | | | |
|---|---|---|---|
| 3,328,589 | 6/1967 | Ferguson | 350—96 X |
| 2,341,934 | 2/1944 | Martin | 250—237 X |
| 2,967,664 | 1/1961 | Ress. | |
| 3,184,732 | 5/1965 | Haynes | 250—227 X |
| 3,327,287 | 6/1967 | Ball et al. | 250—227 X |

ROBERT SEGAL, *Primary Examiner.*

U.S. Cl. X.R.

350—96; 250—219